Feb. 15, 1966 K. L. MILLS 3,235,508
CATALYST COMPOSITIONS AND METHOD FOR THEIR PREPARATION
Filed March 19, 1962
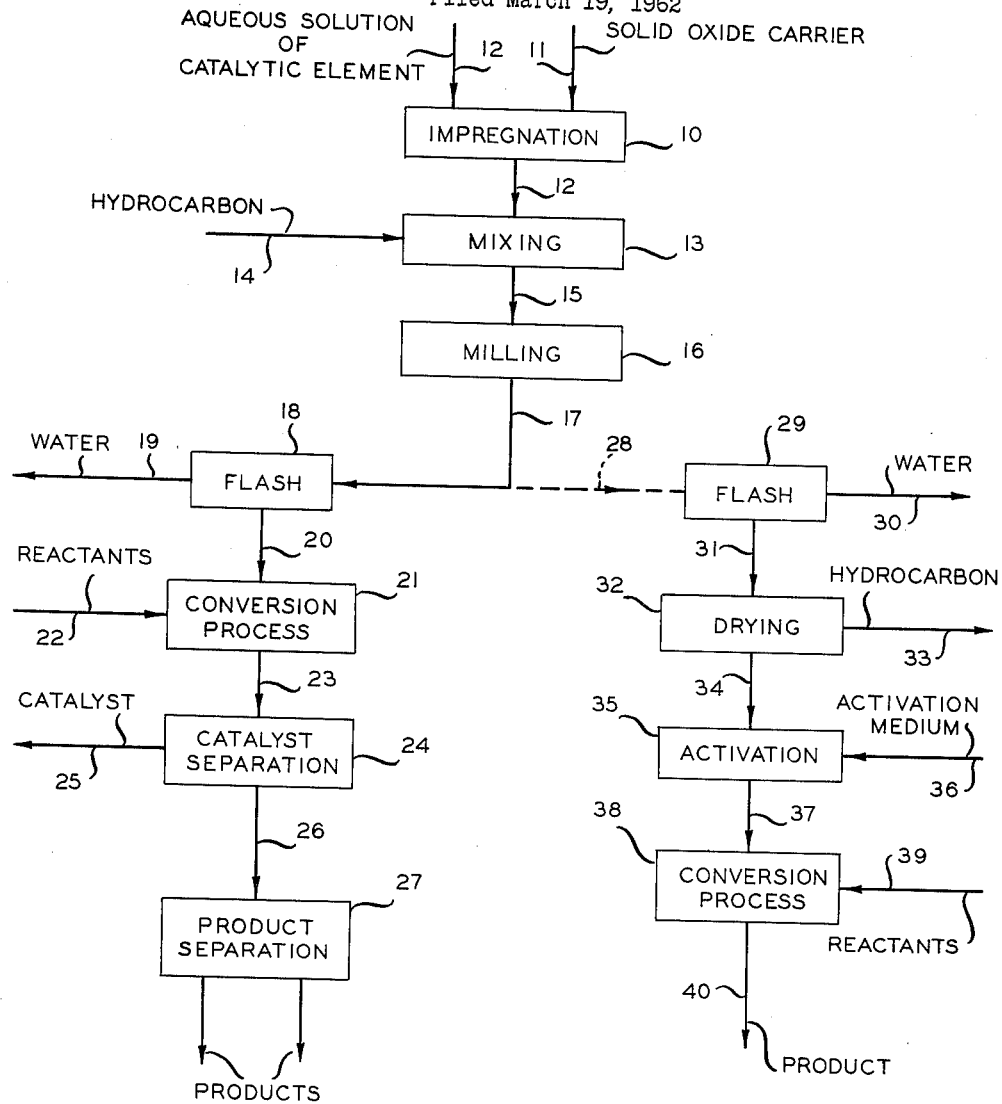
INVENTOR.
K. L. MILLS
BY
*Young & Quigg*
ATTORNEYS

United States Patent Office 3,235,508
Patented Feb. 15, 1966

3,235,508
CATALYST COMPOSITIONS AND METHOD FOR THEIR PREPARATION
King L. Mills, Bartlesville, Okla., assignor to Phillips Petroleum Company, a corporation of Delaware
Filed Mar. 19, 1962, Ser. No. 180,743
7 Claims. (Cl. 252—430)

This invention relates broadly to the manufacture of catalysts. In accordance with one aspect, this invention relates to a method for preparing catalysts comprising finely divided, non-porous solid oxide bases. In another aspect, this invention relates to novel catalyst compositions.

It is known that various reactants, especially hydrocarbons, can be converted either thermally or catalytically to some desired product. Many catalysts, both supported and unsupported, are known for hydrocarbon conversion reactions. However, many of the known catalysts are difficult to prepare in a desirable form for use in a particular hydrocarbon conversion process. For example, catalysts prepared from finely divided, non-porous solid oxides by impregnation with a metal catalyst element, and subsequently dried, do not retain the low density and fine characteristic of the original oxide carrier. Instead, the wet cake dries to a hard, relatively densified cake which can be broken into hard granules. Although the cake or granules can be ground to fairly fine particles, e.g., 100-mesh and finer, the grinding does not effect sub-division even approaching the fineness of the original solid oxide carrier, which ordinarily has an average particle size of not over 100 millimicrons and more often less than 50 millimicrons.

The present invention is directed to an improved method for preparing catalysts from such finely divided, non-porous solid oxide carriers wherein the discrete particle sizes of the carrier are retained for use in the subsequent hydrocarbon conversion process.

Accordingly, an object of this invention is to provide a method for making catalysts from non-porous, finely divided solid oxide bases or carriers.

Another object of this invention is to provide a method for directly utilizing catalysts prepared from non-porous, finely divided solid oxide bases in a conversion process.

A further object of this invention is to provide novel catalyst compositions.

A further object of this invention is to provide catalyst compositions wherein finely divided, non-porous catalysts dispersed in suitable hydrocarbons can be passed directly to a hydrocarbon conversion process.

Other objects, aspects, as well as the several advantages of the invention will be apparent to those skilled in the art upon further study of the specification and the appended claims.

Broadly, according to the invention, a novel catalyst composition is provided comprising a finely divided, non-porous pyrogenic oxide having average particle sizes of less than about 100 millimicrons impregnated with a metal catalytic promoting agent dispersed in a liquid non-deleterious dispensing medium such as a liquid hydrocarbon.

Further, according to the invention, a method is provided for preparing slurries of supported catalysts suitable for direct charging to the reaction zone which comprises the steps of slurrying a finely divided, non-porous solid oxide carrier (also known as "finely divided pyrogenic oxides") with an aqueous solution of a metal catalytic element to impregnate the support with the catalytic element, mixing the slurry thus formed with a liquid hydrocarbon that is non-deleterious to the catalytic element, milling the mixture thus formed until a uniform dispersion is obtained, subjecting the dispersion thus obtained to flashing conditions to free the dispersion of water, and recovering a slurry of said catalyst in said hydrocarbon substantially free of water as a product of the method.

The catalyst slurry obtained according to the process described above can be charged directly to a conversion process, e.g., catalytic hydrogenation such as hydrocracking, especially where the catalytic element does not need any special activation treatment prior to contacting with the reactant material in the conversion zone. In such an operation, it is ordinarily preferred that the hydrocarbon employed as the finely divided catalyst dispersing medium be the same hydrocarbon material as the reactant hydrocarbon employed in the conversion process.

Alternatively, when a preliminary activation step or treatment is required the catalytic element prior to use, the slurry of finely divided catalyst in hydrocarbon recovered after flashing to remove water can be heated or otherwise treated to remove the hydrocarbon dispersing medium to recover a dry catalyst consisting of the finely divided support impregnated with the desired metal catalytic element. The dry catalyst recovered is then subjected to the desired activation treatment prior to charging the activated catalyst to a conversion process.

By the term finely-divided, non-porous solid oxides (also known as "finely divided pyrogenic oxides") is meant nonhydrated and substantially anhydrous (i.e., not over about 5% volatile matter) oxides having an average discrete particle size of not over 100 millimicrons, preferably less than 50 millimicrons, and produced by vapor phase hydrolysis or oxidation of compounds of the corresponding metals and/or metalloids. Such vapor phase reactions are generally carried out at temperatures of about 1000° F. or higher. For example, halides or other vaporizable compounds of one or more of the elements (Al, Zr, Ti and Si) can be mixed with high temperature steam or carried into a combustion zone in which excess oxygen is present or in which high temperature water vapor is being produced by combustion of a hydrogen-containing fuel. The resultant reaction produces a fine aerosol of solid oxides or mixed oxides in gaseous by-products from which the oxides may be recovered in aerosol form made up of very small discrete particles. Since the gaseous by-products are separated from the solid oxide at temperatures above that at which any of said by-product condenses, the resultant oxides are not hydrated and, instead are very pure and substantially anhydrous. For example, silica (also known as Cab-O-Sil) produced in this way is about 99% pure, while alumina (also known as Alon C) of this type usually contains about 5% or less volatile matter.

The catalytic element to be deposited, preferably by impregnation, on the above-defined finely divided, non-porous pyrogenic oxide carriers can be any metal of the periodic system known to be effective as a catalyst promotor. The choice of catalytic element to be employed will depend upon the utimate use of the catalyst, i.e., the particular reaction process in which the final catalyst composition will be employed. Ordinarily, the catalytic elements will be one or more metals selected from Group II to Group VIII metals of the periodic system. More often, the catalytic element will be selected from metals of Groups IV, V, VI and VIII of the periodic system. Metals frequently employed for the preparation of catalysts include molybdenum, chromium, tungsten, cobalt, vanadium, titanium, platinum, nickel, and the like.

The amount of catalytic element deposited on the support will be the conventional amount ordinarily employed for any given service for the catalyst, and these amounts are well known by those skilled in the art. The catalysts of the invention are prepared most conveniently by impregnation of the finely divided, non-porous pyrogenic solid oxide carriers with an aqueous solution of a compound of the desired metal catalytic element. Ordinarily, an aqueous solution of a metal oxide, metal hydroxide, or other compound, e.g., soluble salts of the metal, convertible to metal oxides, for example, by calcination, can be employed for impregnating the supports of the invention.

The impregnated finely divided, non-porous solid oxide carriers of the invention are dispersed in a normally liquid hydrocarbon or hydrocarbon mixture which can boil as low as butane and as high as topped crude, i.e., from about 10° F. to about 900° F. or higher. The particular hydrocarbon selected as the dispersing medium will depend upon the ultimate process use for the catalyst dispersion prepared according to the invention. Hydrocarbons that can be employed include saturated and unsaturated acyclic, saturated and unsaturated cyclic and aromatic hydrocarbons or combinations or mixtures thereof. Petroleum refinery hydrocarbon fractions such as gasolines, kerosenes, stove oils, furnace oils, gas oils, cycle oils, diesel fuels, crude oils, topped crude as well as other hydrocarbon fractions are especially useful as the dispersing medium according to the invention, particularly when the reactant hydrocarbon in the conversion process and the catalyst dispersing hydrocarbon are the same hydrocarbon materials. The particular hydrocarbon selected will depend upon the ultimate use for the catalyst dispersion, the particular metal catalytic element employed as well as other conditions. In any event, the hydrocarbon dispersing medium selected should be non-deleterious to the catalyst dispersed therein. Also, it is preferred that the hydrocarbon dispersing medium be a non-reactant or substantially inert in the presence of the catalyst under the conditions employed for preparing the dispersion of the invention.

A better understanding of the invention will be obtained upon reference to the accompanying schematic flow sheet which is a block diagram representing the sequence of steps employed in practicing the process of the present invention according to two preferred embodiments.

Referring now to the drawing, according to one specific embodiment of the invention, a hydrocracking catalyst is prepared by suspending same in the reactant hydrocarbon and subsequently passing the catalyst dispersion directly to a suspended catalyst hydrocracking operation for hydrocracking topped crude. A finely divided pyrogenic alumina is introduced into impregnation zone 10 by way of line 11 and is contacted therein with an aqueous solution of cobalt nitrate and ammonium molybdate introduced through line 12. The alumina base is impregnated in zone 10 by thoroughly mixing same with the aqueous solution of catalytic element until a uniform slurry is obtained. The mixing in zone 10 can be continued until it is certain that the alumina carrier is impregnated with the desired amount of the catalytic element, which is cobalt-molybdate in this embodiment.

An aqueous slurry of the impregnated finely divided pyrogenic alumina carrier is removed from zone 10 and passed to mixing zone 13 wherein the aqueous slurry is intimately mixed with a hydrocarbon dispersing medium introduced by way of line 14. In the present embodiment, the hydrocarbon dispersing medium employed is topped crude, which is also the reactant for the subsequent hydrocracking process. The amount of hydrocarbon mixed with the aqueous slurry in zone 13 will be sufficient to provide a final mixture containing hydrocarbon as a major proportion of the mixture. The mixture obtained in zone 13 is then passed by way of line 15 to milling zone 16 wherein the mixture obtained in zone 13 is subjected to high-shear milling. Milling zone 16 can be any known milling or grinding device suitable for subjecting the mixture to high-shear milling so as to form a uniform dispersion of the catalyst in the hydrocarbon. Suitable devices include three-roll paint mills, pigment mills, ink mills, ball mills, colloid mills, homogenizers or similar devices.

The high-shear milling effected in zone 16 generally causes heating of the dispersion being passed through the mill so that the effluent removed from the milling zone ordinarily can be subjected to flash conditions without further heating to remove water from the dispersion. However, if the high-shear milling does not cause a sufficient temperature rise of the mixture, the mixture in line 15 passed to milling zone 16 can be heated or, if desired, the effluent removed by line 17 from milling zone 16 can be heated to the desired flashing temperature for removing water. Generally, the effluent removed from milling zone 16 is at a temperature ranging from about 225 to about 400° F., preferably from about 250 to about 350° F. to facilitate substantially complete water removal by flashing from the milling zone effluent. The mill effluent in line 17 at an elevated temperature such as set forth above is passed to flash zone 18 wherein the water is flashed off from the dispersion and removed by way of line 19. A liquid colloidal suspension of finely divided catalyst in topped crude, which is substantially water-free, is removed from flash zone 18 by way of line 20.

The liquid colloidal suspension of catalyst in topped crude removed from the water flash zone is passed directly to a hydrocracking reaction zone 21. Topped crude reactant and hydrogen are charged to hydrocracking zone 21 along with the colloidal suspension which is operated under conventional conditions of temperature, pressure and reaction time to convert the topped crude to the desired product. The reactant and hydrogen can be charged to zone 21 by way of line 22. The hydrocracking reaction improves the gravity of the reactant hydrocarbon, which is ordinarily a material of poor properties, as well as effecting the removal of undesirable contaminants such as sulfur compounds, nitrogen compounds, organometallic compounds, and the like. The condition obtaining in zone 21 ordinarily range from a temperature of about 600 to about 900° F., a pressure ranging from about 100 to 5000 p.s.i.g., a liquid hourly space velocity ranging from about 0.2 to about 10 and a hydrogen flow rate of about 500 to about 10,000 cubic feet per barrel of oil feed. The catalyst usually amounts to about 0.2 to about 5 weight percent, preferably about 1 to about 5 weight percent of the oil charged. When the oil-catalyst suspension is prepared with a higher concentration of catalyst than desired in the conversion zone, catalyst-free oil can be charged in sufficient amount to reduce the catalyst concentration to the desired level.

The hydrocracking zone effluent removed by line 23 is processed for catalyst and product separation. The catalyst can be separated, for example, by fractionation of the hydrocracker effluent to produce a slurry oil containing the catalyst, and the catalyst recovered therefrom by filtration or centrifuging. The recovered catalyst can be regenerated by burning off the carbon in a suspended solid type of operation. The above procedure is generally referred to in the drawing as zone 24. The catalyst removed from zone 24 by line 25 can be recycled to the hydrocracking zone 21 when desired. The products freed of catalyst are passed by way of line 26 to product separation wherein the products are separated into individual components by known separation procedures.

In the particular embodiment described above, any catalyst activation which is needed is effected in the reaction or conversion zone by hydrogen. Since no specific activation step is required in many processes, including for example, in addition to hydrocracking processes such as reforming, dehydrogenation, and similar processes, the present invention provides a very desirable procedure for preparing slurries of supported catalysts which are suitable for direct charging to the reaction zone. As indicated above, in the preparation of catalyst slurries that can be charged directly to a reaction process, it is preferred that the catalyst dispersing medium be the same hydrocarbon as the reactant hydrocarbon employed in the conversion process. However, in some instances, it may be desirable to employ a hydrocarbon dispersing medium that is not the same hydrocarbon as employed in the conversion process and such operations or procedures are likewise contemplated according to the invention. The invention resides in the preparation procedure and resulting dispersion for finely divided pyrogenic oxide carriers rather than the specific catalyst promotor and dispersing medium.

As indicated previously, in some processes, it is desirale, and often necessary, to activate the catalyst prior to charging same to the reaction zone. The present invention also provides a procedure whereby catalysts can be activated in a separate step prior to use in the conversion step without substantial loss in the fineness of subdivision of the catalyst.

The following specific embodiment illustrates the invention in the preparation of a catalyst for use in an olefin polymerization process employing a silica-alumina support for chromium oxide to convert 1-olefins to high molecular weight solid polymers. However, it will be evident to those skilled in the art that this embodiment of the process of the invention can be utilized to prepare catalysts for other processes where a specific activation step or treatment is needed to activate the catalyst.

A finely divided pyrogenic solid oxide, for example, silica, alumina, or silica-alumina is impregnated by mixing same with an aqueous solution of chromium trioxide in impregnation zone 10. The catalyst can be prepared by using as a starting material chromium trioxide, chromic nitrate, chromic acetate, chromic chloride, chromic sulfate, ammonium dichromate or other soluble salts of chromium. The wet impregnated solid oxide carrier is removed from zone 10 and then mixed preferably with a readily vaporizable hydrocarbon in mixing zone 13.

Hydrocarbons preferred as the dispersing medium for the chromium catalyst of this specific embodiment are the relatively inert, non-deleterious liquid hydrocarbons that are ordinarily employed as the reaction diluent in the subsequent polymerization. Hydrocarbon diluents that can be employed include paraffins and/or cycloparaffins having from 3 to 12, preferably 5 to 12, carbon atoms per molecule. Suitable diluents include butanes, pentanes, hexanes, heptanes, isooctanes, cyclohexanes, methylcyclohexane and the like. Aromatic hydrocarbons, such as benzene, can also be employed but are less preferred in many cases. The amount of hydrocarbon mixed with the aqueous slurry is sufficient to form a mixture containing hydrocarbon in a major proportion.

The mixture formed in zone 13 is passed to milling zone 16 wherein the mixture is subjected to high-shear milling as described in the previous embodiment. In the instant embodiment, it is preferred that the mill effluent be maintained at a temperature below about 150° F. or 200° F. in order to minimize reaction of the chromium compound with the hydrocarbon dispersing medium. The mill effluent is passed to flash zone 29 wherein the mixture is subjected to flashing conditions so as to remove water from the mixture and recover a colloidal slurry of catalyst and hydrocarbon.

The colloidal slurry of catalyst in hydrocarbon is withdrawn from flash zone 29 by way of line 31 and passed to a drying zone 32 wherein the hydrocarbon dispersing medium is vaporized from the slurry and removed by way of line 33. Vaporization of the hydrocarbon can be effected in zone 32 by passing the slurry through a steam atomizing nozzle in which sufficient superheated steam is used to vaporize the liquid of the slurry without condensing any substantial amount of the steam. The nozzle effluent is thus hydrocarbon vapors, dry steam and dry, finely divided catalyst. This effluent is separated to recover the catalyst in substantially the finely divided, low bulk density form of the original carrier by settling, for example, in a settling chamber, cyclone, bag filter, or other suitable means.

The dry, finely divided catalyst is removed from drying zone 32 by way of line 34 and passed to activation zone 35 wherein it is contacted under suitable conditions with an activation medium. A chromium oxide catalyst such as described in this embodiment is ordinarily activated at a temperature of at least about 450° F. and not substantially greater than 1500° F. Time of activation can range from about a second at the higher temperatures to 50 hours or more at the lower temperatures. By using very short times and higher temperature or very long times and lower temperatures, catalysts having various degrees of increased activation are obtainable. The catalyst in zone 35 is heated preferably under non-reducing conditions in an atmosphere such as oxygen, air, nitrogen, carbon dioxide, helium, argon, krypton, or xenon. The activation can be carried out in a variety of ways, such as passing a slow stream of air through a bed of the catalyst maintained at the desired temperature, passing the catalyst suspended in an air stream through a tube maintained at the desired elevated temperature, or other effective methods can be used.

The activated catalyst can be removed from zone 35, suspended in the reaction diluent, and passed by way of line 37 to polymerization zone 38. A suitable olefin reactant to be polymerized as well as reaction diluent are introduced into zone 38 by way of line 39. Olefin monomers that can be polymerized to solid polymers include 1-olefins having from 2 to 8 carbon atoms per molecule such as ethylene, propylene, butene-1, pentene-1, hexene-1, octene-1 and the like including mixtures of these 1-olefins as well as other monomers copolymerizable therewith such as butadiene, isoprene and the like. The catalyst and reactant in the diluent are contacted in zone 38 under polymerization conditions to form solid polymer.

The temperature to be used in carrying out the polymerization reaction can vary over a broad range but normally ranges from about 100 to about 500° F., preferably from about 150 to 450° F. The pressure is preferably high enough to maintain any diluent (perferably paraffin or cycloparaffin) in the liquid phase. Ordinarily, the pressure ranges from 100 to as high as 700 p.s.i., or higher, if desired. The feed rate can range from 0.1 to 20 liquid hourly space velocity with a preferred range of 1 to 6 liquid hourly space velocity in a liquid-phase process with fixed-bed catalyst. The polymerization can be effected with a fixed-bed catalyst or with a mobile catalyst. Polymer product is removed by way of line 40 and can be passed to conventional separation procedures for recovery of unreacted olefin, recovery of diluent and separation of catalyst.

The following examples are given to better illustrate the invention. It will be noted from the examples that the smaller particle size of the carrier is preserved by the process of the present invention.

EXAMPLE I

A catalyst dispersed in Wafra topped crude was made as follows:

One hundred grams of Alon C alumina were densified with 300 ml. of solution consisting of 3.4 g. of $MoO_3$ in 50 ml. of H₂O containing 15.7 g. of Versene chelating agent (used to solubilize the MoO₃) and 10.4 grams of $$Co(NO_3)_2 \cdot 6H_2O$$

A homogeneous gel or paste resulted. The gel was dispersed in 2150 grams of Wafra topped crude using a Gaulin R.E. colloid mill with a clearance of .008 inch. The dispersion was then used in hydrocracking experiments. The dispersion analyzed 3.64 weight percent ash when made and 3.99 weight percent ash after 18 days on the shelf.

|  | Catalyst composition, wt. percent | |
|---|---|---|
|  | Calculated | Analysis of recovered catalyst |
| CoO | 2.5 | 2.0 |
| MoO₃ | 3.2 | 4.3 |
| Al₂O₃ | 94.3 | 93.7 |

(Ash in Wafra-catalyst dispersion calculated 4.95, based on original starting weights.)

Surface area, sq.m./g., 83.

Cracking tests were made using a ¼-inch O.D. stainless steel reactor tube with a volume of 30 ml. Charge was Wafra topped crude containing 3.6 weight percent catalyst.

*Catalyst*

| Test Number | 1 | 2 | 3 |
|---|---|---|---|
| Temperature, °F | 825 | 850 | 888 |
| Pressure, p.s.i. | 1,000 | 1,000 | 1,000 |
| LHSR | 0.62 | 0.51 | 1.2 |
| CFH₂/bbl. oil | 8,200 | 10,500 | 4,800 |
| Duration, hours | 6 | 6 | 6 |
| Products, wt. percent charge: | | | |
| Gas, C⁴ | 5.1 | 4.1 | 4.0 |
| C₅–400 F | 1.6 | 7.9 | 13.6 |
| 400–500 F | 9.4 | 3.2 | 12.8 |
| 500–850 F | 43.6 | 57.6 | 52.5 |
| 850 F+ | 36.1 | 13.3 | 9.3 |
| Coke | 1.0 | 1.1 | 2.1 |
| Sulfur (as H₂S) | 0.9 | 2.0 | 1.7 |
| Loss | 2.3 |  | 4.0 |
| Conversion, 850 F+, wt. percent | 34 | 57 | 83 |
| Percent disulfurization | 25 | 76 | 54 |
| Percent C residue removal | 64 | 94 | 78 |

The process was inoperable in the range of 800–825° F. when no catalyst was used due to coking of the reactor tube.

Tests were also made with 0.2 and 1.0 weight percent unpromoted Alon C alumina dispersed in the oil by colloid mill. The process was inoperable at 850° F. due to coking of the reactor tube.

EXAMPLE II

In a comparative catalyst preparation, a catalyst dispersed in Wafra topped crude was prepared as follows:

One hundred grams of Alon C alumina was wet with 350 ml. of solution consisting of 175 ml. H₂O and 175 ml. concentrated NH₄OH containing 6.15 g. of $$(NH_4)_6Mo_7O_{24} \cdot 4H_2O$$

(55 percent Mo). The gelatinous gel which formed was dried overnight under a heat lamp. Hard 8–40 mesh particles resulted.

Three hundred fifty ml. of H₂O containing 10.4 grams of CO(NO₃)₂·6H₂O was poured over the catalyst and the solution evaporated under a heat lamp and then calcined at 1000° F. for one hour.

The catalyst was ground in a ball mill to pass a 35 mesh screen (most was 100 mesh or less) and then passed through a colloid mill with Wafra topped crude to form a uniform dispersion. The catalyst settled out overnight and no hydrocracking tests were made in the tube reactor.

The Alon C alumina employed in the previous examples is manufactured by Godfrey L. Cabot, Inc., and has the following product data:

| | |
|---|---|
| Color | White. |
| Al₂O₃ content (moisture-free basis) | 95% minimum. |
| Particle size range | 0.01–0.04 micron. |
| Surface area (BET-nitrogen adsorption method) | 50–100 m²/g. |
| Specific gravity | 3.3–3.6. |
| Total non Al₂O₃ oxides | 0.2% maximum. |
| Free moisture (105° C.) | 2% maximum. |
| Ignition loss (1000° C.) | 3% maximum. |
| pH (10% aqueous suspension) | 4–5. |
| Bulk density | 3–5 lb./ft.³ |

It will be observed from the above specific examples that the smaller particle size of the alumina carrier was preserved by the process of the invention in Example I, but was not preserved in the control run in Example II. The catalyst prepared by impregnation and drying as described in Example II did not retain the low density and fine characteristics of the original alumina carrier. Instead, the wet cake dried to a hard, relatively densified cake which had to be broken into smaller particles, yet after drying the particles were of the order of 35 to 100 mesh. Thus, it can be seen that grinding does not effect sub-division even approaching the fineness of the original carrier which is commonly 0.01 to 0.04 micron.

While this invention has been described and illustrated by the examples shown, it is not intended to be strictly limited thereto, and other modifications and variations can be employed within the scope of the following claims.

I claim:

1. A method for preparing a slurry of a supported catalyst which comprises the steps of:
   (1) slurrying a finely divided non-porous pyrogenic oxide of at least one element selected from the group consisting of Al, Zr, Ti, and Si with an aqueous solution of a catalytic metal promotor element to impregnate said pyrogenic oxide with the catalytic element,
   (2) mixing the slurry thus formed with an inert, non-deleterious liquid hydrocarbon in an amount sufficient to form an admixture containing a major proportion of said hydrocarbon,
   (3) milling the mixture obtained in step (2) at a temperature such that reaction between the hydrocarbon in said dispersion and the catalyst is minimized until a uniform dispersion is obtained,
   (4) subjecting the dispersion obtained in step (3) to flashing conditions to free the dispersion of water, and
   (5) recovering a slurry of catalyst in said hydrocarbon substantially free of water as a product amenable to being passed directly to a reaction zone.

2. A method according to claim 1 including the additional steps wherein
   (6) the finely divided catalyst recovered in step (5) is separated as dry caltayst from said slurry, and
   (7) said dry catalyst is then activated by heating in the presence of an activating medium thereby rendering same amenable to being passed directly to further reaction.

3. A method for preparing a slurry of a supported catalyst and for directly charging said slurry to a reaction zone which comprises the steps of
   (1) impregnating a finely divided non-porous pyrogenic oxide of at least one element selected from the group consisting of Al, Zr, Ti, and Si having average particle sizes of less than about 100 millimicrons with an aqueous solution of a catalytic metal element,
   (2) mixing wet impregnated solid oxide obtained in step (1) with an inert, non-deleterious liquid hydrocarbon to form a mixture containing a major proportion of said hydrocarbon, (3) milling the mixture obtained in step (2) at an elevated temperature sufficient to cause vaporization of water from the milled uniform dispersion obtained when subjected to flashing conditions, and (4) passing the milled dispersion to a flash vaporization zone to free the dispersion of water and recover a slurry of finely divided catalyst in hydrocarbon which is amenable to being passed directly to further reaction.

4. A method according to claim 3 wherein said dispersing hydrocarbon and said reactant hydrocarbon is a topped crude and said catalyst is a cobalt-molybdate-alumina catalyst.

5. A method for preparing a supported catalyst which comprises the steps of (1) impregnating a finely divided non-porous pyrogenic oxide of at least one element selected from the group consisting of Al, Zr, Ti, and Si having average particles sizes of less than about 100 millimicrons with an aqueous solution of a catalytic metal element, (2) mixing wet impregnated solid oxide obtained in step (1) with an inert, non-deleterious liquid hydrocarbon to form a mixture containing a major proportion of said hydrocarbon, (3) milling the mixture obtained in step (2) at an elevated temperature sufficient to cause vaporization of the water from the milled uniform dispersion obtained when subject to flashing conditions, (4) passing the milled dispersion to a flash vaporization zone to free the dispersion of water and recover a slurry of finely divided catalyst in hydrocarbon, (5) subjecting the slurry of finely divided catalyst in hydrocarbon to vaporization conditions so as to remove hydrocarbon therefrom and leave dry, finely divided catalyst, and (6) activating said dry catalyst by heating same in the presence of an activating medium in order to prepare same to be passed directly to further reaction.

6. A process according to claim 5 wherein said catalytic metal element is a chromium compound, and said milling in step (3) is maintained at a temperature below about 200° F. in order to minimize reaction of the chromium compound with the hydrocarbon.

7. A catalyst composition consisting essentially of a finely divided, non-porous solid pyrogenic oxide of at least one element selected from the group consisting of Al, Zr, Ti, having average particle sizes of less than about 100 millimicrons and cobalt molybdate dispersed in a liquid non-deleterious hydrocarbon medium.

References Cited by the Examiner

UNITED STATES PATENTS

| | | | |
|---|---|---|---|
| 2,292,708 | 8/1942 | Mavity | 208—119 |
| 2,314,561 | 3/1943 | Skowronski | 208—122 |
| 2,826,620 | 3/1958 | Matuszak | 252—465 X |
| 2,830,960 | 4/1958 | Broomhead | 252—465 |
| 3,004,086 | 10/1961 | Moon | 260—683.15 |
| 3,132,125 | 5/1964 | Schwander et al. | 252—458 X |

MAURICE A. BRINDISI, *Primary Examiner.*